United States Patent [19]

Coetzer

[11] Patent Number: 5,476,732
[45] Date of Patent: Dec. 19, 1995

[54] ELECTROCHEMICAL CELL

[75] Inventor: Johan Coetzer, Transvaal, South Africa

[73] Assignee: Programme 3 Patent Holdings, Luxembourg

[21] Appl. No.: 220,844

[22] Filed: Mar. 31, 1994

[30] Foreign Application Priority Data

Apr. 2, 1993 [ZA] South Africa ............... 93/2406
Apr. 2, 1993 [ZA] South Africa ............... 93/2408

[51] Int. Cl.$^6$ ............................................. H01M 10/39
[52] U.S. Cl. .................. 429/103; 29/623.1; 205/57; 205/60; 205/66
[58] Field of Search ................ 429/103, 128; 24/623.1; 205/57, 60, 66

[56] References Cited

U.S. PATENT DOCUMENTS

| | | | |
|---|---|---|---|
| 4,529,676 | 7/1985 | Galloway et al. | 429/103 |
| 4,560,627 | 12/1985 | Bones et al. | 429/103 |
| 4,973,534 | 11/1990 | Adendorff et al. | 429/103 |
| 5,019,466 | 5/1991 | Coetzer et al. | 429/103 |
| 5,283,135 | 2/1994 | Redey et al. | 429/103 |

FOREIGN PATENT DOCUMENTS

| | | | |
|---|---|---|---|
| 2141576 | 12/1984 | United Kingdom | H01M 4/04 |
| 2191332 | 12/1987 | United Kingdom | H01M 10/39 |
| 9406677 | 5/1994 | United Kingdom | |

*Primary Examiner*—Stephen Kalafut
*Attorney, Agent, or Firm*—Arnold, White & Durkee

[57] ABSTRACT

A high temperature rechargeable electrochemical power storage cell has an anode compartment and a cathode compartment separated from each other by a separator. The cathode compartment contains a current collector; an alkali metal aluminium halide molten salt electrolyte having the formula $MAlHal_4$; an alkali metal halide; and a cathode. The cathode comprises an electrolyte-permeable porous matrix, a first active cathode substance in the matrix in a first zone adjacent the current collector and spaced from the separator, and a second active cathode substance in the matrix in a further zone adjacent the first zone. The first active cathode substance is such that it gives rise to a higher cell potential than does the second active cathode substance. The cell is chargeable at a temperature at which the electrolyte and the alkali metal are molten to cause the active cathode substances to be halogenated.

8 Claims, 2 Drawing Sheets

ELECTROCHEMICAL CELL

THIS INVENTION relates to an electrochemical cell. It relates also to a method of making an electrochemical cell.

According to a first aspect of the invention, there is provided a high temperature rechargeable electrochemical power storage cell, which comprises a cell housing having an anode compartment and a cathode compartment separated from each other by a separator which comprises a solid conductor of ions of an alkali metal M, the cathode compartment containing, when the cell is in its discharged state, a current collector;

an alkali metal aluminium halide molten salt electrolyte having the formula $MAlHal_4$ wherein M is the akali metal of the separator and Hal is a halide;

an alkali metal halide MHal wherein M and Hal are respectively an alkali metal and a halide; and a cathode comprising an electrolyte-permeable porous matrix which has an active cathode material dispersed therein, which is electrochemically conductive, and which is in contact with the current collector; and as the active cathode material, a first active cathode substance in the matrix in a first zone adjacent the current collector and spaced from the separator, and a second active cathode substance in the matrix in a further zone adjacent the first zone, with the first active cathode substance being such that it gives rise to a higher cell potential than does the second active cathode substance, and with both the first and the second active cathode substances comprising at least one transition metal selected from the group consisting of Mo, Cu, Ni, Co, Fe, Cr and Mn, with the cell being chargeable at a temperature at which the molten salt electrolyte and alkali metal M are molten to cause the active cathode substances to be halogenated, with alkali metal M being produced and passing through the separator into the anode compartment, the proportions of alkali metal halide, MHal, and molten salt electrolyte being selected so that when the cell is fully charged and all the available active cathode substances have been halogenated, the proportion of alkali metal ions and aluminium ions in the electrolyte is such that the solubility of the active cathode material in the molten electrolyte is at near its minimum.

In one embodiment of the invention, the first active cathode substance may, for example, be nickel, with the second active cathode substance, for example, being Fe. During charging of the cell, the Fe is first converted into $FeHal_2$ followed by an upward voltage step to charge the Ni to $NiHal_2$ until all the available MHal is consumed.

Without wishing to be bound by theory, it is believed that, during discharge of the cell, one or both of the following phenomena can occur. Firstly, the Ni, having the higher cell potential or open cell voltage, will first discharge through an external circuit coupled to the cell, so that the cathode first or core zone is utilized during the early stages of discharging, and the further or second zone of $FeHal_2$ is made available for later discharge. Secondly, the nickel based core zone, will form an internal cell with the iron based further zone, converting unreacted Fe into $FeHal_2$ and 'cleaning out' the core zone of chloride ions, ie deblocking the core zone, in accordance with the reaction:

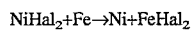
$NiHal_2+Fe \rightarrow Ni+FeHal_2$

It has been found that in cathodes comprising a single active cathode substance only, concentration polarization can occur during cell discharge, particularly towards the end of cell discharge, leading to increased cell resistance and hence power loss. It is believed that, on cell discharge, a reaction zone moves through the cathode, starting at the cathode surface which is in contact with the separator, and ending at the current collector. It is thus further believed that a prime zone where polarization can occur is immediately adjacent the current collector. It is still further believed that this phenomenon is at least reduced with the electrochemical cell of the present invention, having the first active cathode substance of higher potential immediately adjacent the current collector, and the second active cathode substance of lower cell potential, in a further zone adjacent the core zone.

While Ni has been given as an example of the first active cathode substance, and Fe as an example of the second active cathode substance, any combination of the transition metals hereinbefore listed, can be used, provided that the transition metal resulting in the higher cell potential is always used in the core zone and bearing in mind that, as regards cell potential, the transition metals can be listed as follows, in sequence of decreasing cell potential:

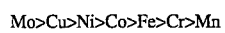
Mo>Cu>Ni>Co>Fe>Cr>Mn

In another embodiment of the invention, at least one additive element selected from the group consisting of As, Bi, Sb, Se and Te, may be dispersed in or together with the transition metal of at least one of the zones of the cathode. The active cathode substance may then, in its fully charged state, be in the form of a mixture, alloy, solid solution, composition or compound. It may be a single phase substance, or if it has more that one phase, each phase may comprise both the transition metal and the additive. When the additive element is present, the active cathode substance may thus be substantially the same as the active cathode material described in our Patent Application No. 08/344,651, filed Nov. 18, 1994, for which the issue fee was paid on Aug. 16, 1995, which is a continuation of U.S. Ser. No. 08/215/844, filed Mar. 22, 1994, now abandoned, entitled 'Electrochemical Cell' claiming priority from amongst others, South African Provisional Patent Applications No. 93/2406 filed on 2 Apr. 1993, and which is hence incorporated herein by reference. The atomic ratio of transition metal:additive element in the active cathode substances may be 99:1–30:70. For example, the cell may then have NiSb as first active cathode substance in the core zone, and Ni as second active cathode substance in the further zone. A further example is where the core zone has $CuNiSb_2$ as the first active cathode substance, with the further zone containing $Ni_3Sb$ as the second active cathode substance.

The molar proportion of the first active cathode substance in the core zone to the second active cathode substance in the further zone may be between 10:90 to 90:10, preferably in the range 10:90 to 50:50.

The molar proportion or ratio of alkali metal ions and aluminium ions in the electrolyte is preferably not less than 1, to obtain said minimum solubility.

While M and Hal if the alkali metal halide MHal will normally be the same as the M and Hal respectively of the electrolyte $MAlHal_4$, they can, however, instead be different.

The alkali metal, M, may be sodium, with the separator being β-alumina. However, in other embodiments of the invention, the alkali metal may instead be potassium or lithium, with the separator then being selected to be compatible therewith.

The halogen may be chlorine, so that the alkali metal halide, MHal, is sodium chloride. The electrolyte may then be in the form of a sodium chloride-aluminium chloride mixture, or in the form of a double salt, ie NaAlCl$_4$. However, the halogen may instead be bromine or iodine, so that the alkali metal halide is then NaBr or NaI, with the electrolyte being NaAlBr$_4$ or NaAlI$_4$ respectively.

While the cell housing can in principle be of any desired shape, it may, in a preferred embodiment, be of cylindrical form, with the separator also being of cylindrical form so that the one compartment is located at the centre of the housing, and the other compartment is in the form of an annulus around the separator. When the cathode compartment is at the centre of the housing, the current collector may comprise a suitable current collecting rod or the like protruding into the compartment. However, when the cathode compartment is in the form of the annulus as described, the cell housing or casing can then constitute at least part of the current collector.

According to a second aspect of the invention, there is provided a method of making a high temperature rechargeable electrochemical power storage cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminium halide molten salt electrolyte which is also molten at the operating temperature of the cell and having the formula MAlHal$_4$, wherein M is the alkali metal of the anode, and Hal is a halide, the cathode compartment containing also a cathode which comprises an electronically conductive electrolyte permeable matrix which has dispersed therein an active cathode substance, the matrix being impregnated with said electrolyte, and, separating the anode compartment from the cathode compartment, a separator which comprises a solid conductor of the ions of the alkali metal of the anode, the method comprising loading into the cathode compartment of a cell housing comprising an anode compartment separated from a cathode compartment by a separator which is a solid conductor of ions of alkali metal M;

an alkali metal aluminium halide molten salt electrolyte having the formula MAlHal$_4$, wherein M is the alkali metal of the anode and Hal is a halide;

an alkali metal halide MHal wherein M and Hal are respectively an alkali metal and a halide;

a first active cathode substance in a first zone adjacent a current collector of the cathode compartment; and a second active cathode substance in a further zone adjacent the first zone, with the first active cathode substance being such that it gives rise to a higher cell potential than does the second active cathode substance, and with both the first and the second active cathode substances comprising at least one transition metal selected from the group consisting of Mo, Cu, Ni, Co, Fe, Cr and Mn.

The method may include loading into at least one of the zones of the cathode compartment, at least one additive element selected from the group consisting of As, Bi, Sb, Se and Te, such that the additive element is dispersed in or together with the transition metal in the zone.

As described hereinbefore, the molar proportion of first active cathode substance in the first or core zone to the second active cathode substance in the further or second zone may be between 10:90 to 90:10, preferably between 10:90 and 50:50.

As also hereinbefore described, the alkali metal, M, is preferably sodium, and Hal is preferably chlorine, so that the electrolyte is NaAlCl$_4$.

While the transition metals may be loaded in a chlorinated state, dispersed as a mixture in an electronically conductive, porous electrolyte permeable matrix together with the electrolyte, with the anode compartment being loaded with sodium so that the cell is loaded in its charged state, it is preferred to load the cell in its discharged or even overdischarged state. Thus, instead, the transition metals may be loaded in metallic and elemental form, admixed with a suitable proportion of NaCl and, optionally, NaAlCl$_4$ (when loaded in the discharged state) or Al (when loaded in the overdischarged state). In this case, a small starting amount of Na may be loaded into the anode compartment, to place the cell separator in contact with an anode current collector, or an anode current collector may be in direct contact with the separator so that no sodium need then be loaded. Whether loaded in the discharged or overdischarged state, application of a suitable charging potential will be used in this case to convert what amounts to a discharged or overdischarged cell or cell precursor, into a charged cell according to the invention.

When the transition metals are added in metallic/elemental form, they may be added as a particulate mixture comprising distinct particles thereof, together with the other cell constituents, ie molten salt electrolyte or its constituents as NaCl, AlCl$_3$ and Al, and dopants such as NaF and FeS, which are contained in the cathode compartment, optionally after being formed into granules.

The respective proportions of the active cathode substances may be selected bearing in mind factors such as cell design and cost. For example, where the more expensive transition metal is used in the core zone, the core zone size will be kept to a minimum, bearing in mind also that proportions of the active cathode substances may be electrochemically unavailable for the cell charge/discharge reactions and can form, in the charged cell, an electronically conductive electrolyte permeable porous matrix in which the chlorinated active cathode material will be dispersed, typically with some NaCl, the matrix also being saturated with molten NaAlCl$_4$ electrolyte.

BRIEF DESCRIPTION OF THE DRAWINGS

The invention will now be described by way of example, with reference to the following example and diagrammatic drawings, in which

Referring to FIG. 1, reference numeral 10 generally indicates a test cell according to the invention.

Figure 1:
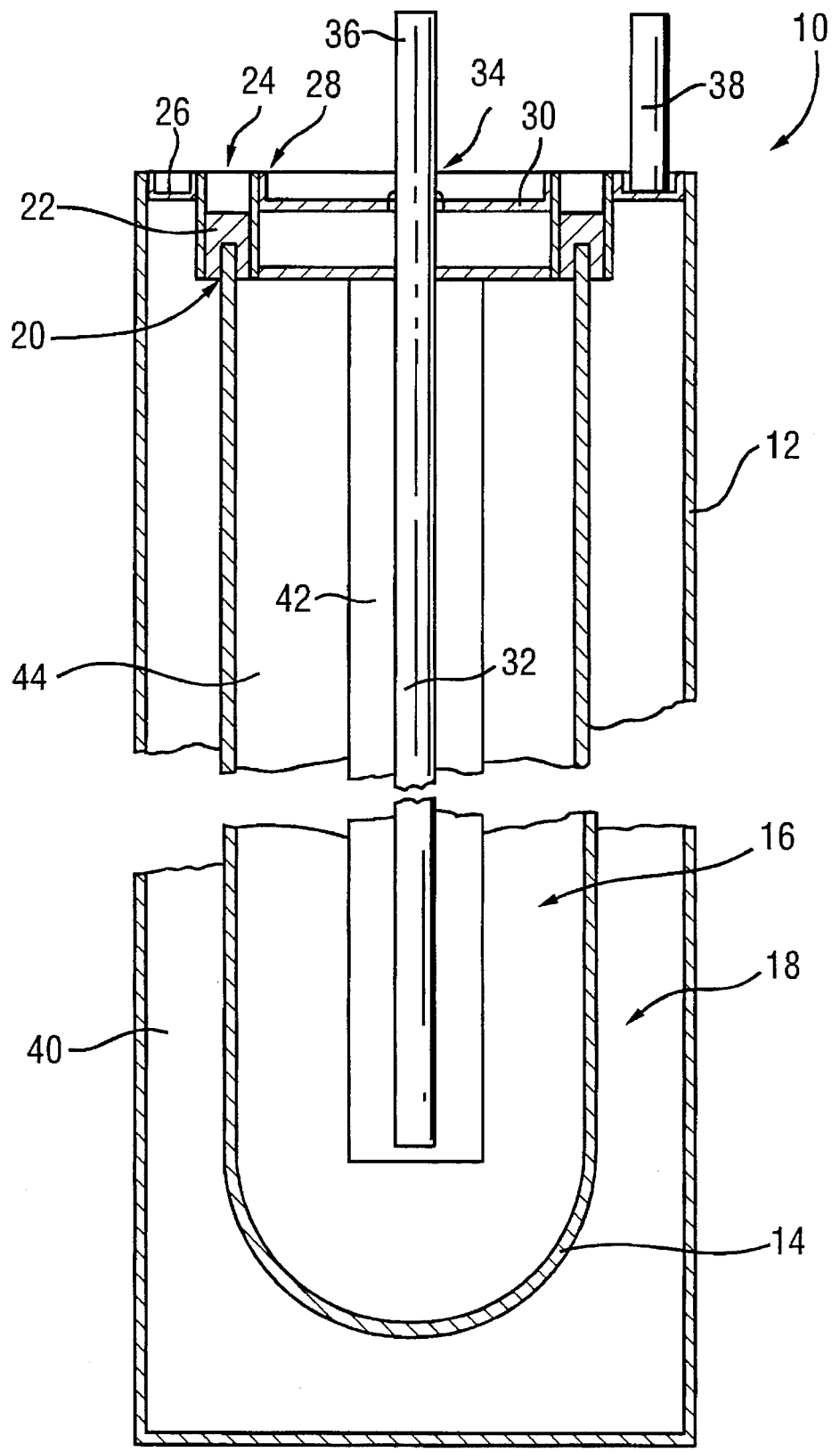
FIG. 1 shows a schematic sectional side elevation of a cell in accordance with the present invention.

The cell 10 comprises a mild steel cylindrical housing 12 containing, concentrically suspended therein and radially spaced therefrom, a β-alumina separator tube 14. The interior of the tube 14 defines a cathode compartment 16, while the annular space between the tube 14 and the housing 12 provides an anode compartment 18. The tube 14 is glass welded at 20 to an α-alumina insulating collar 22. The collar 22 is sealed, at 24, to a radially inwardly protruding peripherally extending rim or flange 26 of the housing 12. The collar 22 is also sealed, at 28, to a tube closure panel 30. A nickel rod cathode current collector 32 projects through the panel 30, to which it is sealingly welded at 34. The upper end of the rod 32 forms a cathode terminal 36 above the panel 30. Its lower end is close to the closed lower end of the tube 14. An anode terminal 38 projects upwardly from the outer edge of the rim 26. The anode compartment 18 contains molten sodium active anode material 40. In the compartment 16 is provided a cathode comprising an electrolyte permeable porous matrix impregnated with $NaAlCl_4$ molten salt electrolyte and having dispersed therein, in a core zone 42, nickel as an active cathode substance. In a annular zone 44, around the core zone 42, Fe is dispersed in the matrix as a second active cathode substance. The cathode is formed as hereinafter described.

A first intimate cathode starting mixture was prepared in powder form (maximum particle size 200 microns) and having the composition as shown in the following table:

TABLE 1

| CONSTITUENT | MOLE PERCENT |
| --- | --- |
| Ni | 51 |
| NaCl | 44 |
| NaF | 2 |
| FeS | 1 |
| Al | 2 |

A second intimate cathode starting mixture was prepared in powder form, having the same maximum particle size as the first mixture, and having the composition as shown in Table 2.

TABLE 2

| CONSTITUENT | MOLE PERCENT |
| --- | --- |
| Fe | 51 |
| NaCl | 44 |
| NaF | 2 |
| FeS | 1 |
| Al | 2 |

Both starting mixtures were cold pressed at 285 mPa into small (0,5–2 mm) granules. Granules having the composition in accordance with Table 1 were loaded into the cathode compartment 16 of the test cell according to FIG. 1, in the core zone 42 around the rod 32. Granules having the composition of Table 2 were then loaded into the annular zone 44 between the core zone 42 and the tube 14. The mass ratio of granules loaded into the core zone (Table 1) to those loaded into the annular zone (Table 2) was 1:5. A small starting amount of sodium was loaded into the anode compartment, to connect the tube 14 electronically to the housing 12. The cell was heated to its operating temperature of about 270° C., and a charging potential applied thereto to cause the Al to react electrochemically with some of the NaCl according to the reaction:

$$Al+4NaCl \rightarrow NaAlCl_4+3Na$$

Thereafter electrochemical chlorination of the Ni and Fe took place according to the reactions:

$$Ni+2NaCl \rightarrow NiCl_2+2Na$$

$$Fe+2NaCl \rightarrow FeCl_2+2Na$$

The Na produced passed in ionic form through the separator 14 into the anode compartment.

The NaF and FeS were used as dopants, known in the art, respectively for resisting separator poisoning and resisting crystallite growth; and the proportions of Ni, Fe and NaCl were selected so that, when the cell was fully charged and all the available Ni and Fe was chlorinated, sufficient Ni and Fe remained to form a porous electrochemically conductive matrix in the cell compartment, in contact with the current collector 32 while some free NaCl remained in the cathode compartment, disposed in this matrix, together with the chlorinated Ni and Fe, to ensure that the $NaAlCl_4$ did not become acidic.

A control cell was constructed, loaded and charged in identical fashion save that, in this case, there was no core zone 42 containing nickel as an active cathode substance, ie the only active cathode substance present was Fe.

The test and control cells were each put through a number of charge/discharge cycles at 270° C. In each case, the cell capacity was 40 Ah, with the charging current being 2,5 amps and the discharging current 5 amps.

Figure 2:
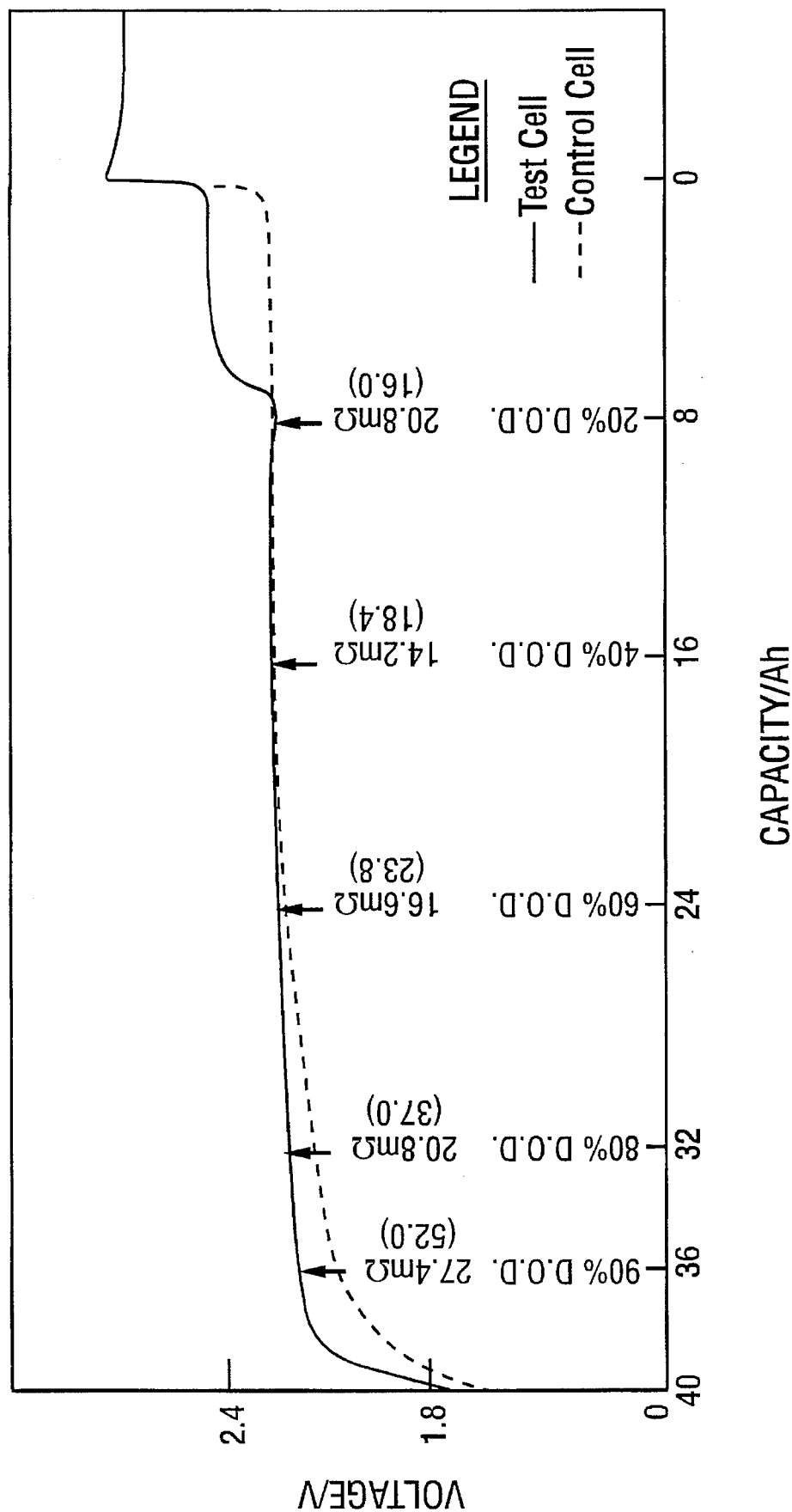
FIG. 2 shows discharge curves of a test cell according to the invention, and of a control cell, being a plot of cell voltage against cell capacity.

The results of the tests are shown in FIG. 2. In FIG. 2, cell resistance at various DOD ('Depth of Discharge') levels are given, with the unbracketed values referring to the test cell in accordance with the invention, and the bracketed values referring to the control cell.

From FIG. 2, it will be noted that at the beginning of the discharge cycle, the curve for the test cell in accordance with the invention shows a residual Ni voltage plateau at a higher level than the remainder of the curve which reflects the Fe voltage plateau. However, at the end of discharge the Fe-plateau for the test cell remains substantially flat and significantly above the level of the control cell. Thus, the test cell in accordance with the invention shows good discharge characteristics at the end of the discharge cycle, indicating significantly reduced polarization and hence improved power characteristics.

I claim:

1. A high temperature rechargeable electrochemical power storage cells, which comprises a cell housing having an anode compartment and a cathode compartment separated from each other by a separator which comprises a solid conductor of ions of an alkali metal M, the cathode compartment containing, when the cell is in its discharged state, a current collector;

an alkali metal aluminum halide molten salt electrolyte having the formula $MALHal_4$ wherein M is the alkali metal of the separator and Hal is a halide;

an alkali metal halide MHal wherein M and Hal are respectively an alkali metal and a halide; and a cathode comprising an electrolyte-permeable porous matrix which has an active cathode material dispersed therein, which is electrochemically conductive, and which is in contact with the current collector; and as the active cathode material, a first active cathode substance in the matrix in a first zone adjacent the current collector and spaced from the separator, and a second active cathode substance in the matrix in a further zone adjacent the first zone, with the first active cathode substance being such that it gives rise to a higher cell potential than does the second active cathode substance, with both the first and the second active cathode substance comprising at least one transition metal selected from the group consisting of Mo, Cu, Ni, Co, Fe, Cr and Mn, and with the proviso that the first active cathode substance is not Mn and the second active cathode substance is not Mo.

with the cell being chargeable at a temperature at which the molten salt electrolyte and alkali metal M are molten to cause the active cathode substances to be halogenated, with alkali metal M being produced and passing through the separator into the anode compartment, the proportions of alkali metal halide, MHal, and molten salt electrolyte being selected so that when the cell is fully charged and all the available active cathode substances have been halogenated, the proportion of alkali metal ions and aluminum ions is the electrolyte is such that the solubility of the active cathode material in the molten electrolyte is at or near its minimum.

2. A cell according to claim 1, wherein at least one additive element selected from the group consisting of As, Bi, Sb, Se and Te, is dispersed in or together with the transition metal of at least one of the zones of the cathode.

3. A cell according to claim 1, wherein the molar proportion of the first active cathode substance in the first zone to the second active cathode substance in the further zone is between 10:90 to 10:10.

4. A cell according to claim 3, wherein the molar proportion of the first active cathode substance in the first zone to the second active cathode substance in the further zone is between 10:90 and 50:50.

5. A method of making a high temperature rechargeable electrochemical power storage cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminum halide molten salt electrolyte which is also molten at the operating temperature of the cell and having the formula $MALHal_4$, wherein M is the alkali metal of the anode, and Hal is a halide, the cathode compartment containing also a cathode which comprises an electronically conductive electrolyte permeable matrix which has dispersed therein an active cathode substance, the matrix being impregnated with said electrolyte, and separating the anode compartment from the cathode compartment, a separator which comprises a solid conductor of the ions of the alkali metal of the anode, the method comprising loading into the cathode compartment of a cell housing comprising an anode compartment separated from a cathode compartment by a separator which is a solid conductor of ions of alkali metal M;

an alkali metal aluminum halide molten salt electrolyte having the formula $MALHal_4$, wherein M is the alkali metal of the anode and Hal is a halide;

an alkali metal halide MHal wherein M and Hal are respectively an alkali metal and a halide;

a first active cathode substance in a first zone adjacent a current collector of the cathode compartment; and a second active cathode substance in a further zone adjacent the core zone, with the first active cathode substance being such that it gives rise to a higher cell potential than does the second active cathode substance, with both the first and the second active cathode substances comprising at least one transition metal selected from the group consisting of Mo, Cu, Ni, Co, Fe, Cr and Mn, and with the proviso that the first active cathode substance is not Mn and the second active cathode substance is not Mo.

6. A method according to claim 5, which includes loading into at least one of the zones of the cathode compartment, at least one additive element selected from the group consisting of As, Bi, Sb, Se and Te, such that the additive element is dispersed in or together with the transition metal in the zone.

7. A method according to claim 5, wherein the molar proportion of first active cathode substance in the first zone to the second active cathode substance in the further zone is between 10:90 to 90:10.

8. A method according to claim 7, wherein the molar proportion of first active cathode substance in the first zone to the second active cathode substance is between 10:90 and 50:50.

* * * * *

UNITED STATES PATENT AND TRADEMARK OFFICE
CERTIFICATE OF CORRECTION

PATENT NO. : 5,476,732

DATED : December 19, 1995

INVENTOR(S) : Johan Coetzer

It is certified that error appears in the above-identified patent and that said Letters Patent is hereby corrected as shown below:

In claim 1, column 7, line 6, delete "is the" and insert --in the-- therefor.

In claim 3, column 7, line 16, delete "to 10:10." and insert --to 90:10.-- therefor.

Signed and Sealed this

Ninth Day of April, 1996

Attest:

BRUCE LEHMAN

Attesting Officer

Commissioner of Patents and Trademarks